United States Patent Office 3,334,108
Patented Aug. 1, 1967

3,334,108
CERTAIN DERIVATIVES OF CHLORODITHIO-
PICOLINIC ACIDS
Howard Johnston, Walnut Creek, Calif., assignor to The
Dow Chemical Company, Midland, Mich., a corporation of Delaware
No Drawing. Filed Jan. 10, 1966, Ser. No. 519,465
10 Claims. (Cl. 260—294.8)

This application is a continuation-in-part of my prior application Ser. No. 359,440, filed Apr. 13, 1964.

The present invention is concerned with certain esters and nitrogen derivatives of chlorodithiopicolinic acids, particularly with compounds having the formula

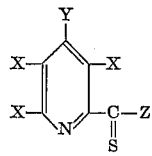

I

In this and succeeding formulas, each X is independently hydrogen or chlorine and at least one X is chlorine; Y is hydrogen, amino, monoalkylamino or dialkylamino wherein the alkyl contains from 1 to 4 carbon atoms, inclusive; and Z is one of —SR, —NHNH$_2$, —NHR', —N(R")$_2$,

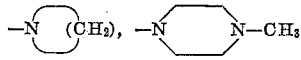

and —NHNHCONH$_2$ wherein R is selected from the group consisting of lower alkyl containing from 1 to 4 carbon atoms, inclusive, chloroallyl and carboxymethyl, R' and R" are lower alkyl containing from 1 to 4 carbon atoms, inclusive, and $n$ is an integer of 4 to 5, inclusive. As generally recognized and evident from the foregoing formula, nitrogen derivatives of dithiopicolinic acids such as amides, hydrazides and semicarbazides would have only one sulfur atom at the acid group.

The products of the present invention are light yellow to red colored crystalline solids or oils, generally of low solubility in water and of moderate to high solubility in organic solvents such as acetone, xylene, ethanol, isopropyl alcohol, dimethylformamide and dimethyl sulfoxide.

The products are useful as active toxic ingredients in parasiticide compositions for the control of parasites. They are also useful as piscicides for the control of trash fish. Many of the compounds are further useful as miticide, insecticide or for killing soil-dwelling nematodes.

The products of the present invention which are thio-esters, i.e., Z in Formula I is SR, may be prepared by mixing together a 2-(trichloromethyl)pyridine compound having the formula

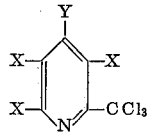

II with sodium sulfide to produce an intermediate sodium chlorodithiopicolinate compound having the formula

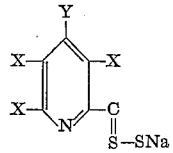

III and sodium chloride by-product. In the present application, the α-trichloromethyl group has been designated as being in the 2 position although it is recognized that under alternative nomenclature it may often be designated as being in the 6 position. The sodium chlorodithiopicolinate intermediate is then reacted with an appropriate halo compound having the formula, R-halogen, to produce the desired thio-ester product. The halogen in R-halogen may be iodine, bromine or chlorine. When R is alkyl, bromides are generally useful, although where R is methyl, methyl iodide is conveniently employed. Where R is chloroallyl or carboxymethyl, the halogen is conveniently chlorine because of the ready availability of chloroallyl chloride and chloroacetic acid.

The products of the present invention which are nitrogen derivatives, i.e., amides, hydrazides or semicarbazides, may be prepared by mixing together and reacting an ester prepared as above described with an appropriate nitrogen base. By "nitrogen base" is meant one of the following compounds: NH$_2$NH$_2$, NH$_3$, NH$_2$R', HN(R")$_2$,

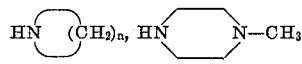

and NH$_2$NHCONH$_2$. Although any of the esters may be employed in carrying out the reaction, the preferred ester is one in which R in Formula I is carboxymethyl. When employing the carboxymethyl ester, the reaction is carried out in aqueous solution and the ester which may be designated as a (chlorothiopicolinoylthio) acetate intermediate may be represented by the formula

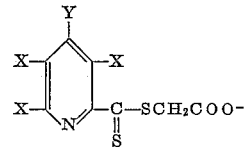

IV is mixed together and reacted with an appropriate nitrogen base to obtain the desired nitrogen derivative of chlorodithiopicolinic acid. Where the ester has not been previously prepared, the preparation of the nitrogen derivatives may be carried out from the appropriate 2-(trichloromethyl) pyridine compound (Formula II) without isolating the intermediate ester as hereinafter more fully described.

In carrying out the reaction for the preparation of the esters of the chlorodithiopicolinic acid compounds, an appropriate 2-(trichloromethyl) pyridine compound and sodium sulfide are first brought together and stirred in a solvent such as methanol or ethanol. The exact amounts of the reactants are not critical, some of the product being formed in any case but for good results it is desirable to employ about two molar proportions of the sodium sulfide for each molar proportion of 2-(trichloromethyl) pyridine. The reaction may be carried out in the temperature range of from about 15° to about 80° C.; the reaction is conveniently carried out by stirring at room temperature or by heating at reflux temperature. The period for the reaction may vary from several hours to overnight; longer periods have been employed but primarily from standpoint of convenience rather than necessity. As a result of these operations, a reaction takes place with the formation of a sodium chlorodithiopicolinate intermediate and sodium chloride by-product. The former generally remains in solution in the alcoholic medium while the latter precipitates therein. The sodium chloride may be removed by filtration or decantation and the alcoholic solution vaporized to remove the solvent and to recover the intermediate sodium chlorodithiopicolinate as residue. The sodium chlorodithiopicolinate intermediate may be purified by washing with a non-polar solvent such as hexane, pentane, benzene, dichloromethane, etc. The salt intermediate is then dissolved in a minor amount of an alcoholic solvent such as methanol or ethanol and the appropriate R-halogen compound added thereto and caused to react with the salt intermediate to obtain the desired ester product and sodium halide by-product. The sodium halide by-product is removed by filtration, the filtrate subjected to reduced pressure with or without heating to remove the solvent and to recover the desired ester as residue. The ester, if solid, may be purified, if desired, by washing with alcohol or recrystalizing from hexane, benzene-hexane, etc. The ester, if liquid, may be purified by extracting the crude ester with a solvent such as hexane or pentane, recovering the hydrocarbon extract by decantation and thereafter vaporizing off the solvent.

The preparation of the nitrogen derivatives of chlorodithiopicolinic acid may be carried out by mixing together and causing to react an ester prepared as above described with an appropriate nitrogen base in a solvent such as methanol or ethanol. The exact amounts of the reactants are not critical, some of the product being formed in any case, but for good results it is desirable to employ a slight excess of the nitrogen base on a molar basis. The reaction may be carried out in the temperature range of from about 0° C. to about 80° C. for a time of from a few minutes to about one hour. As a result of these operations, a reaction takes place with the formation of the desired nitrogen derivative of chlorodithiopicolinic acid which precipitates in the reaction mixture as a solid or an oil. The product may be recovered from the mixture by filtration or by vaporizing off the solvent or by extracting the mixture with a water-immiscible solvent such as benzene, dichloromethane, hexane, etc.; the product thereafter may be purified, if desired, by recrystallizing from hexane, benzene or mixtures thereof, or by washing with hexane, etc.

In a modified and preferred procedure for the preparation of the nitrogen derivatives, a carboxymethyl ester having the Formula IV is employed in a solution made alkaline with sodium carbonate. In carrying out the reaction, the appropriate carboxymethyl ester and a slight molar excess of nitrogen base are mixed together in an aqueous alcoholic solvent at temperatures of from about 0° C. to about 40° C. for from about five to twenty minutes. The reaction takes place rapidly with the evolution of heat and the formation of the desired nitrogen derivative product of chlorodithiopicolinic acid compound as a solid or an oil. The product may be recovered and purified as previously set forth.

Since the esters employed for the preparation of the nitrogen derivatives are novel compounds, unless previously prepared esters are available, the nitrogen derivatives are preferably prepared fom an appropriate 2-(trichloromethyl)pyridine compound in a sequence of steps in which the ester is an intermediate in the reaction but is not isolated and purified.

In carrying out the reaction from 2-(trichloromethyl) pyridine compound, about one molar proportion of 2-(trichloromethyl)pyridine and two molar proportions of sodium sulfide are mixed together in an alcoholic solvent as above described to produce a sodium chlorodithiopicolinate intermediate and sodium chloride by-product. To the resulting reaction mixture, an aqueous solution of one molar proportion of chloroacetic acid and one molar proportion of sodium carbonate are added and the resulting mixture stirred as above described for the preparation of esters to obtain a sodium (chlorothiopicolinoylthio)acetate intermediate and sodium chloride by-product which remain dissolved in the reaction medium. Thereafter, a slight molar excess of an appropriate nitrogen base is added to the cooled reaction mixture and the reaction allowed to take place at from about 0° C. to about 40° C. at from atmospheric to autogeneous pressure. When ammonia is the nitrogen base reactant, the reaction is preferably carried out in a bomb at self-generated pressure and temperature. The reaction between the nitrogen base and the (chlorothiopicolinoylthio)acetate intermediate is rapid and the desired product is usually obtained in a few minutes. After completion of the reaction, the product may be recovered and purified as previously described.

The following examples illustrate the invention but are not to be construed as limiting:

EXAMPLE 1

Methyl 3,6-dichlorodithiopicolinate 5.3 grams (0.02 mole) of 3,6-dichloro-2-(trichloromethyl)-pyridine was added to a solution of 10.8 grams (0.0045 mole) of sodium sulfide nonahydrate in 70 milliliters of methanol. The resulting mixture was stirred for four hours at about 25° C. whereupon a reaction took place with the formation of a sodium 3,6-dichlorodithiopicolinate intermediate compound and sodium chloride by-product which precipitated in the reaction mixture. The latter was removed by filtration and filtrate subjected to reduced pressure to vaporize off the methanol and to recover the sodium dichlorodithiopicolinate intermediate as residue.

The sodium dichlorodithiopicolinate was washed with hexane and then dissolved in a small amount of methanol and 3.55 grams (0.025 mole) of methyl iodide added thereto. The resulting mixture was stirred for one hour at room temperature and thereafter allowed to stand at room temperature for several days to complete the reaction with the formation of the desired methyl 3,6-dichlorodithiopicolinate product. The reaction mixture was subjected to aspirator vacuum to remove the methanol to recover the product as residue. The product was dried in benzene over sodium sulfate and recrystallized from hexane to obtain a purified methyl 3,6-dichlorodithiopicolinate product having a melting point of 53°–55° C.

EXAMPLE 2

In a manner similar to that described in Example 1, the following compounds are prepared:

Methyl 6-chlorodithiopicolinate as a red crystalline solid having a melting point of 115°–116° C. by the reaction of 6-chloro-2-(trichloromethyl)pyridine and sodium sulfide nonahydrate to form the intermediate sodium 6-chlorodithiopicolinate, followed by the reaction of the latter with methyl iodide.

Methyl 5,6-dichlorodithiopicolinate as a red crystalline solid melting from 143° to 146° C. by the reaction of 5,6-dichloro-2-(trichloromethyl)pyridine and sodium sulfide nonahydrate to form the intermediate sodium 5,6-dichlorodithiopicolinate, followed by the reaction of the latter with methyl iodide.

Methyl 3,5-dichlorodithiopicolinate as a red solid melting from 41° to 45° C. by the reaction of 3,5-dichloro-2-(trichloromethyl)pyridine and sodium sulfide nonahydrate to form the intermediate sodium 3,5-dichlorodithiopicolinate, followed by the reaction of the latter with methyl iodide.

Isopropyl 3,5-dichlorodithiopicolinate as a deep red liquid having strong infrared absorption bands at 7.0, 9.0, 9.15, 9.55, 10.95, 11.2 and 13.4 microns by the reaction of 3,5-dichloro-2-(trichloromethyl)pyridine and sodium sulfide nonahydrate to form the intermediate sodium 3,5-dichlorodithiopicolinate, followed by the reaction of the latter with isopropyl bromide.

Methyl 3,5,6-trichlorodithiopicolinate as orange-red crystals melting from 81° to 83° C. by the reaction of 3,5,6-trichloro-2-(trichloromethyl)pyridine and sodium sulfide nonahydrate to form the intermediate sodium 3,5,6-trichlorodithiopicolinate, followed by the reaction of the latter with methyl iodide.

n-Butyl 3,5,6-trichlorodithiopicolinate having a molecular weight of 314.6 by the reaction of 3,5,6-trichloro-2-(trichloromethyl)pyridine and sodium sulfide nonahydrate to form the intermediate sodium 3,5,6-trichlorodithiopicolinate, followed by the reaction of the latter with n-butyl bromide.

Ethyl 5,6-dichlorodithiopicolinate having a molecular weight of 252 by the reaction of 5,6-dichloro-2-(trichloromethyl)pyridine and sodium sulfide nonahydrate to form the intermediate sodium 5,6-dichlorodithiopicolinate, followed by the reaction of the latter with ethyl bromide.

n-Propyl 6-chlorodithiopicolinate having a molecular weight of 231 by the reaction of 6-chloro-2-(trichloromethyl)pyridine and sodium sulfide nonahydrate to form the intermediate sodium 6-chlorodithiopicolinate, followed by the reaction of the latter with n-propyl bromide.

Secondary-butyl 3,6-dichlorodithiopicolinate having a molecular weight of 280 by the reaction of 3,5-dichloro-2-(trichloromethyl)pyridine and sodium sulfide nonahydrate to form the intermediate sodium 3,6-dichlorodithiopicolinate, followed by the reaction of the latter with secondary-butyl bromide.

EXAMPLE 3

*Methyl 4-amino-3,5,6-trichlorodithiopicolinate*

A solution of 50 grams (0.159 mole) of 4-amino-3,5,6-trichloro-2-(trichloromethyl)pyridine was added to a solution of 76 grams of sodium sulfide nonahydrate in 200 milliliters of methanol and the resulting mixture was stirred for about one hour at ambient temperature and thereafter allowed to stand at room temperature for several days. The mixture was stirred for an additional two hours to complete the reaction to obtain a sodium 4-amino - 3,5,6 - trichlorodithiopicolinate intermediate and sodium chloride by-product.

11.3 grams (0.0795 mole) of methyl iodide was added with stirring to about one-half of the reaction mixture containing sodium 4-amino-3,5,6-trichlorodithiopicolinate obtained as above described and the mixture stirred at ambient temperature for about 5 hours to obtain a methyl 4-amino-3,5,6-trichlorodithiopicolinate product and sodium iodide by-product. The mixture was then allowed to stand overnight at room temperature and thereafter filtered to remove the sodium iodide by-product and the sodium chloride by-product from the first step. The filtrate was then subjected to aspirator pressure to remove most of the solvent and to precipitate the ester product as a solid and the remaining mixture filtered to recover the desired solid methyl 4-amino-3,5,6-trichlorodithiopicolinate product. The product was washed with 95 percent ethanol and dried. The methyl 4-amino-3,5,6-trichlorodithiopicolinate product melted from 186° to 189° C. and had elemental analyses as follows:

Theory: C, 29.2; H, 1.74; N, 9.72; Cl, 37.0. Found: C, 29.53; H, 1.81; N, 9.82; Cl, 36.98.

EXAMPLE 4

In a manner similar to that described in Examples 1 and 3, the following compounds are prepared:

Methyl 3,5-dichloro-4-(dimethylamino)dithiopicolinate as an orange-red liquid having strong infrared absorption bands at 6.5, 7.1, 8.5, 9.05, 9.9 and 11.0 microns by the reaction of 3,5-dichloro-4-(dimethylamino)-2-(trichloromethyl)pyridine and sodium sulfide nonahydrate to form the intermediate sodium 3,5-dichloro-4-(dimethylamino)dithiopicolinate, followed by the reaction of the latter with methyl iodide.

Methyl 4-amino-3,5-dichlorodithiopicolinate as a yellow solid having a melting point of 197°–199° C. by the reaction of 4-amino-3,5-dichloro-2-(trichloromethyl)pyridine and sodium sulfide nonahydrate to form the intermediate sodium 4-amino-3,5-dichlorodithiopicolinate, followed by the reaction of the latter with methyl iodide.

Methyl 4 - (di-n-butylamino) - 3,5 - dichlorodithiopicolinate having a molecular weight of 365 by the reaction of 4-(di-n-butylamino)-3,5-dichloro-2-(trichloromethyl)-pyridine and sodium sulfide nonahydrate to form the intermediate sodium 4-(di-n-butylamino)-3,5-dichlorodithiopicolinate, followed by the reaction of the latter with methyl iodide.

Ethyl 6-chloro-4-methylaminodithiopicolinate having a molecular weight of 246.7 by the reaction of 6-chloro-4-methylamino-2-(trichloromethyl)pyridine and sodium sulfide nonahydrate, to form the intermediate sodium 6-chloro-4-methylaminodithiopicolinate, followed by the reaction of the latter with ethyl bromide.

Isopropyl 5,6-dichloro-4-isopropylaminodithiopicolinate having a molecular weight of 323 by the reaction of 5,6-dichloro - 4 - isopropylamino - 2 - (trichloromethyl)pyridine and sodium sulfide nonahydrate to form the intermediate sodium 5,6-dichloro-4-isopropylaminodithiopicolinate, followed by the reaction of the latter with isopropyl bromide.

n-Butyl 3,5,6-trichloro-4-(diethylamino)dithiopicolinate having a molecular weight of 386 by the reaction of 3,5,6 - trichloro - 4 - (diethylamino) - 2 - (trichloromethyl)pyridine and sodium sulfide nonahydrate to form the intermediate sodium 3,5,6-trichloro-4-(diethylamino)-dithiopicolinate, followed by the reaction of the latter with n-butyl bromide.

EXAMPLE 5

*3-chloroallyl 3,5-dichlorodithiopicolinate*

An aqueous solution of 5.5 grams (0.050 mole) of 3-chloroallyl chloride (1,3-dichloro-1-propene) was added to an aqueous solution of 12.3 grams (0.050 mole) of sodium 3,5-dichlorodithiopicolinate, previously prepared in a manner described in Example 1, and the resulting mixture stirred for several hours at ambient temperature and then allowed to stand several days at room temperature to complete the reaction with the formation of a deep red 2-chloroallyl 3,5-dichlorodithiopicolinate product and sodium chloride by-product. The reaction mixture was decanted to remove the sodium chloride and thereafter extracted with dichloromethane, the dichloromethane solution vaporized to remove the solvent and to recover a deep red liquid residue which was then extracted with hexane, filtered and the hexane vaporized off to recover the desired 2-chloroallyl 3,5-dichlorodithiopicolinate product as a deep red liquid, having a sulfur content of 21.82 percent and a chlorine content of 36.10 percent. The theoretical values are 21.5 percent for sulfur and 35.7 percent for chlorine. The product had strong infrared absorption bands at 7.0, 9.1, 9.5, 10.7, 11.25 and 13.4 microns.

EXAMPLE 6

In a manner similar to that described in Example 5, the following compounds are prepared:

3 - chloroallyl 3,5 - dichloro - 4 - (diethylamine)dithiopicolinate having a molecular weight of 370 by the reaction of sodium 3,5-dichloro-4-(diethylamino)dithiopicolinate and 3-chloroallyl chloride.

3-chloroallyl 3,5,6-trichloro-4-isopropylaminodithiopicolinate having a molecular weight of 390 by the reaction of sodium 3,5,6-trichloro-4-isopropylaminodithiopicolinate and 3-chloroallyl chloride.

3-chloroallyl-6-chlorodithiopicolinate having a molecular weight of 264 by the reaction of sodium 6-chlorodithiopicolinate and 3-chloroallyl chloride.

EXAMPLE 7

*2-(3,5-dichlorothiopicolinoylthio)acetic acid*

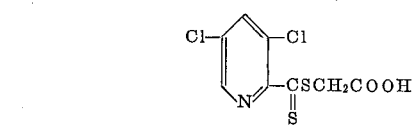

A solution of 15.0 grams (0.0564 mole) of 3,5-dichloro-2-(trichloromethyl)pyridine was added to an agitated solution of 28.4 grams (0.118 mole) of sodium sulfide nonahydrate in 65 milliliters of methanol and the mixture heated at reflux temperature for about 15 minutes to produce a sodium 3,5-dichlorodithiopicolinate intermediate and sodium chloride by-product. A solution of 10.7 grams (0.0564 mole) of chloroacetic acid and 6.2 grams of sodium carbonate in 30 milliliters of water was added to the resulting mixture, heated to reflux for about 5 minutes and then cooled to 0° C. in a Dry Ice bath.

Concentrated hydrochloric acid was then added to the mixture and the mixture extracted with chloroform, the chloroform vaporized off to recover the desired 2-(3,5-dichlorothiopicolinoylthio)acetic acid product as residue. The product melted from 103° to 106° C. The product had elemental analyses as follows:

Theory: C, 34.0; H, 1.77; N, 4.96; S, 22.7. Found: C, 33.65; H, 1.97; N, 5.02; S, 22.54.

EXAMPLE 8

In a manner similar to that described in Example 7, the following compounds are prepared:

2-(4-amino-6-chlorothiopicolinoylthio)acetic acid having a molecular weight of 263 by the reaction of 4-amino-6-chloro-2-(trichloromethyl)pyridine and sodium sulfide nonahydrate to form the intermediate sodium 4-amino-6-chlorodithiopicolinate, followed by the reaction of the latter with chloroacetic acid.

2-(5-chloro-4 - (diethylamino)thiopicolinoylthio)acetic acid having a molecular weight of 318 by the reaction of 5-chloro-4 - (diethylamino)-2 - (trichloromethyl)pyridine and sodium sulfide nonahydrate to obtain an intermediate sodium 5-chloro-4-(diethylamino)dithiopicolinate, followed by the reaction of the latter with chloroacetic acid.

2-(3,5,6-trichlorothiopicolinoylthio)acetic acid having a molecular weight of 317 by the reaction of 3,5,6-trichloro-2-(trichloromethyl)pyridine and sodium sulfide nonahydrate to obtain an intermediate sodium 3,5,6-trichlorodithiopicolinate, followed by the reaction of the latter with chloroacetic acid.

EXAMPLE 9

*6-chlorothiopicolinamide*

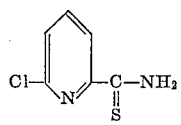

A solution of 50 grams (0.2 mole) of sodium sulfide nonahydrate in 110 milliliters of methanol was added with stirring to a solution of 23.5 grams (0.1 mole) of 6-chloro-2-(trichloromethyl)pyridine in 60 milliliters of methanol. An aqueous solution of 9.5 grams of chloroacetic acid and 5.5 grams of sodium carbonate in 40 milliliters of water was added to the alcoholic mixture and the resulting solution stirred for about 1 hour at ambient temperature, then 12 milliliters of concentrated ammonium hydroxide was added whereupon a reaction took place with the formation of 6-chlorothiopicolinamide product as a crystalline solid. The mixture was allowed to stand for several days to vaporize off unreacted ammonia and to complete the formation of the product. The product was recovered by filtration, washed with water and then recrystallized from benzene-hexane to obtain a purified product melting at 145° C. The product had elemental analyses as follows:

Theory: C, 41.5; H, 2.9; Cl, 20.5; S, 18.5; N, 16.2. Found: C, 41.6; H, 2.79; Cl, 20.55; S, 18.58; N, 16.09.

EXAMPLE 10

*1-(5-chlorothiopicolinoyl)piperidine*

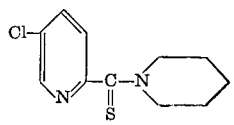

In a manner similar to that described in Example 9, a solution of 15.0 grams (0.0683 mole) of 5-chloro-2-(trichloromethyl)pyridine in 40 milliliters of methanol was mixed with a solution of 34.5 grams (0.144 mole) of sodium sulfide nonahydrate in 75 milliliters of methanol to obtain an intermediate sodium 5-chlorodithiopicolinate compound in the reaction mixture. 12.9 grams (0.137 mole) of chloroacetic acid and 7.26 grams (0.137 mole) of sodium carbonate was then added to the mixture and the mixture heated at reflux temperature (about 74° C.) for about 5 minutes to obtain an intermediate sodium 2-(5-chlorothiopicolinoylthio)acetate. The mixture was cooled immediately to about 35° C. and 8.0 grams (0.094 mole) of piperidine added thereto and the resulting mixture stirred in the temperature range of 40°–45° C. for about 10 minutes to complete the reaction with the formation of the desired 1-(5-chlorothiopicolinoyl)piperidine product as a yellowish green solid. The latter was recovered by filtration, recrystallized from benzene and washed with hexane to obtain a purified product as yellow crystalline solid having a melting point of 137°–138° C.

EXAMPLE 11

*1-(3,5-dichlorothiopicolinoyl)-4-methylpiperazine*

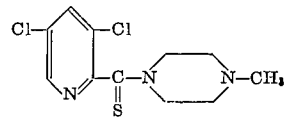

In a manner similar to that described in Example 9, 15 grams (0.0564 mole) of 3,5-dichloro-2-(trichloromethyl)pyridine and 28.4 grams (0.118 mole) of sodium sulfide nonahydrate were mixed together in 65 milliliters of methanol and heated at reflux temperature for about 10 minutes to obtain an intermediate sodium 3,5-dichlorodithiopicolinate compound in the reaction mixture. An aqueous solution of 10.7 grams (0.0564 mole) of chloroacetic acid and 6.2 grams of sodium carbonate was added to the mixture to obtain an intermediate sodium 2-(3,5-dichlorothiopicolinoylthio)acetate, and thereafter 8 grams (0.08 mole) of 1-methylpiperazine added to obtain the desired 1-(3,5-dichlorothiopicolinoyl)-4-methylpiperazine product. The product, after recrystallization from hexane, had a melting point of 100°–101° C. The product had elemental analyses as follows:

Theory: C, 45.5; H, 4.5; Cl, 24.4. Found: C, 45.4; H, 4.53; Cl, 24.52.

EXAMPLE 12

In a manner similar to that described in Examples 9–11, the following compounds are prepared:

1-(6-chlorothiopicolinoyl)piperidine as a yellow solid melting from 103° to 107° C. by the reaction of 6-chloro-2-(trichloromethyl)-pyridine with sodium sulfide nonahydrate to obtain an intermediate sodium 6-chlorodithiopicolinate, followed by the reaction of the latter with sodium chloroacetate to obtain an intermediate sodium 2-(6-chlorothiopicolinoylthio)acetate, followed by the reaction of the latter with piperidine.

3,5-dichloro-N-ethylthiopicolinamide as an oil having strong infrared absorption bands at 3.05, 6.45, 7.1, 7.45, 8.9, 9.3, 10.1, 11.15, 12.1 and 13.2 microns by the reaction of 3,5-dichloro-2-(trichloromethyl)pyridine with sodium sulfide nonahydrate to obtain an intermediate sodium 3,5-dichlorodithiopicolinate, followed by the reaction of the latter with sodium chloroacetate to obtain an intermediate sodium 2-(3,5-dichlorothiopicolinoylthio)acetate, followed by the reaction of the latter with ethylamine.

1-(3,5-dichlorothiopicolinoyl)piperidine having a melting point of 152°–153° C. by the reaction of 3,5-dichloro-2-(trichloromethyl)pyridine with sodium sulfide nonahydrate to obtain an intermediate sodium 3,5-dichlorodithiopicolinate, followed by the reaction of the latter with sodium chloroacetate to obtain an intermediate sodium 2-(3,5-dichlorothiopicolinoylthio)acetate, followed by the reaction of the latter with piperidine.

1 - (3,5 - dichloro - 4 - (di - n - propylamino)thiopicolinoyl)pyrrolidine having a molecular weight of 360 by the reaction of 3,5-dichloro-4-(di-n-propylamino)-2-(trichloromethyl)pyridine with sodium sulfide nonahydrate to obtain an intermediate sodium 3,5-dichloro-4-(din-propylamino)dithiopicolinate, followed by the reaction of the latter with sodium chloroacetate to obtain an intermediate sodium 2 - (3,5 - dichloro - 4 - (di - n - propylamino)thiopicolinoylthio)acetate, followed by the reaction of the latter with pyrrolidine.

3,5 - dichloro - N - methyl - 4 - (dimethylamino)thiopicolinamide having a molecular weight of 264 by the reaction of 3,5 - dichloro - 4 - (dimethylamino) - 2 - (trichloromethyl)pyridine with sodium sulfide nonahydrate to obtain an intermediate sodium 3,5 - dichloro - 4 - (dimethylamino)-dithiopicolinate, followed by the reaction of the latter with sodium chloro-acetate to obtain an intermediate sodium 2-(3,5 - dichloro - 4 - (dimethylamino)thiopicolinoylthio)acetate, followed by the reaction of the latter with methylamine.

4 - amino - 3,5,6 - trichlorothiopicolinamide having a molecular weight of 257 by the reaction of 4 - amino - 3,5,6 - trichloro - 2 - (trichloromethyl)pyridine with sodium sulfide nonahydrate to obtain an intermediate sodium 4-amino - 3,5,6 - trichlorodithiopicolinate, followed by the reaction of the latter with sodium chloroacetate to obtain an intermediate sodium 2 - (4 - amino - 3,5,6 - trichlorothiopicolinoylthio)acetate followed by the reaction of the latter with ammonia.

EXAMPLE 13

*4-amino-N-(n-butyl)-3,5-dichlorothiopicolinamide*

2.38 grams (0.01 mole) of methyl 4 - amino - 3,5 - dichlorodithiopicolinate and 1.1 grams (0.015 mole) of n-butylamine were mixed together in 95 percent ethyl alcohol and the resulting mixture heated for about one hour at reflux temperature to obtain the desired 4-amino-N-(n-butyl) - 3,5 - dichlorothiopicolinamide product as a tan solid melting from 133° to 135° C.

EXAMPLE 14

*6-chlorothiopicolinic acid hydrazide*

A solution of 23.5 grams (0.10 mole) of 6-chloro-2-(trichloromethyl)pyridine in 65 milliliters of methanol was added to a solution of 50.5 grams (0.21 mole) of sodium sulfide nonahydrate in 110 milliliters of methanol with stirring and refluxing and the resulting mixture was heated at reflux temperature for about 15 minutes under nitrogen atmosphere. 9.5 grams of chloroacetic acid and 5.5 grams of sodium carbonate in 40 milliliters of water were then added at once, the mixture heated for about 7 minutes, quickly cooled to about 20° C. and 5.5 grams (0.11 mole) of hydrazine hydrate in 20 milliliters of methanol was added thereto. The resulting mixture was allowed to stir at about 20° to 30° for about 45 minutes to complete the reaction with the formation of the desired 6-chlorothiopicolinic acid hydrazide product. The product was recovered from the reaction mixture by adding water thereto to precipitate the product, the product filtered off and washed with water and recrystallized from benzene-hexane. The purified product had a melting point of 110°–111° C. The product had elemental analyses as follows:

Theory: C, 38.6; H, 3.2; N, 22.5; Cl, 18.9; S, 17.0.
Found: C, 38.39; H, 3.08; N, 22.51; Cl, 18.82; S, 16.96.

EXAMPLE 15

In operations carried out in a manner similar to that described in Example 14, the following compounds are prepared:

3,5-dichlorothiopicolinic acid hydrazide having a melting point 116°–117° C. by the reaction of 3,5 - dichloro-2-(trichloromethyl)pyridine and sodium sulfide nonahydrate to obtain an intermediate sodium 3,5-dichlorodithiopicolinate, followed by the reaction of the latter with sodium chloroacetate to obtain an intermediate sodium 2 - (3,5 - dichlorothiopicolinoylthio)acetate, followed by the reaction of the latter with hydrazine hydrate.

4 - amino - 3,5,6 - trichlorothiopicolinic acid hydrazide having a molecular weight of 272 by the reaction of 4-amino - 3,5,6 - trichloro - 2 - (trichloromethyl)pyridine and sodium sulfide nonahydrate to obtain an intermediate sodium 4 - amino - 3,5,6 - trichlorodithiopicolinate, followed by the reaction of the latter with sodium chloroacetate to obtain an intermediate sodium 2 - (3,5,6 - trichlorothiopicolinoylthio)acetate, followed by the reaction of the latter with hydrazine hydrate.

4 - (di - n - butylamino) - 3,5 - dichlorothiopicolinic acid hydrazide having a molecular weight of 349 by the reaction of 4 - (di - n - butylamino) - 3,5 - dichloro - 2-(trichloromethyl)pyridine and sodium sulfide nonahydrate, to obtain an intermediate sodium 4 - (di - n - butylamino)-3,5-dichlorodithiopicolinate, followed by the reaction of the latter with sodium chloroacetate to obtain an intermediate sodium 2 - (4 - (di - n - butylamino) - 3,5-dichlorothiopicolinylthio)acetate, followed by the reaction of the latter with hydrazine hydrate.

4 - (dimethylamino) - 6 - chlorothiopicolinic acid hydrazide having a molecular weight of 231 by the reaction of 4 - (dimethylamino) - 6 - chloro - 2 - (trichloromethyl)pyridine and sodium sulfide nonahydrate to obtain an intermediate sodium 4 - (dimethylamino) - 6-chlorodithiopicolinate, followed by the reaction of the latter with sodium chloroacetate to obtain an intermediate sodium 2 - (4 - (dimethylamino) - 6 - chlorothiopicolinoylthio)acetate, followed by the reaction of the latter with hydrazine hydrate.

EXAMPLE 16

*1-(6-chlorothiopicolinoyl)semicarbazide*

In a manner similar to that employed for the preparation of amides and hydrazides, 23.1 grams (0.10 mole) of 6-chloro-2-(trichloromethyl)pyridine in 80 milliliters of methanol and 50.5 grams (0.21 mole) of sodium sulfide nonahydrate in 60 milliliters of methanol were refluxed together and reacted to form an intermediate sodium 6-chlorodithiopicolinate. A solution of sodium chloroacetate prepared by mixing together 9.5 grams (0.1 mole) of chloroacetic acid and 5.3 grams (0.05 mole) of sodium carbonate in 40 milliliters of water was added to the reaction mixture containing sodium 6-chlorodithiopicolinate to produce an intermediate sodium 2-(6-chlorothiopicolinoylthio)acetate. A solution of 11.2 grams (0.10 mole) of semicarbazide hydrochloride and 5.3 grams of sodium carbonate in 40 milliliters of water was then added to the reaction mixture containing the intermediate sodium 2-(6-chlorothiopicolinoylthio)acetate to produce the desired 1-(6-chlorothiopicolinoyl)semicarbazide as a yellow solid having a melting point of 198°–200° C.

EXAMPLE 17

In a manner similar to that described in Example 16, the following compounds are prepared:

1-(3,5-dichlorothiopicolinoyl)semicarbazide having a molecular weight of 265 by the reaction of 3,5-dichloro-2-(trichloromethyl)pyridine and sodium sulfide to obtain an intermediate sodium 3,5-dichlorodithiopicolinate, followed by the reaction of the latter with sodium chloroacetate to obtain an intermediate sodium 2-(3,5-dichlorothiopicolinoylthio)acetate, followed by the reaction of the latter with semicarbazide hydrochloride.

1-(4-amino-6-chlorothiopicolinoyl)semicarbazide having a molecular weight of 246 by the reaction of 4-amino-6-chloro-2-(trichloromethyl)pyridine and sodium sulfide to obtain an intermediate sodium 4-amino-6-chlorodithiopicolinate, followed by the reaction of the latter with sodium chloroacetate to obtain an intermediate sodium 2-(4-amino-6 - chlorothiopicolinoylthio)acetate, followed by the reaction of the latter with semicarbazide hydrochloride.

1-(6-chloro-4 - (diethylamino)thiopicolinoyl)semicarbazide having a molecular weight of 302 by the reaction of 6-chloro-4-(diethylamino)-2-(trichloromethyl)pyridine and sodium sulfide to obtain an intermediate sodium 6- chloro-4-(diethylamino)dithiopicolinate, followed by the reaction of the latter with sodium chloroacetate to obtain an intermediate sodium 2-(6-chloro-(4-diethylamino)thiopicolinoylthio)acetate, followed by the reaction of the latter with semicarbazide hydrochloride.

1-(4-n-butylamino)-6 - chloro)thiopicolinoyl)semicarbazide having a molecular weight 358 by the reaction of 4-(n-butylamino)-6-chloro - 2-(trichloromethyl)pyridine and sodium sulfide to obtain an intermediate sodium 4-(n-butylamino)-6-chlorodithiopicolinate, followed by the reaction of the latter with sodium chloroacetate to obtain an intermediate sodium 2-(6-chloro-(4-n-butylamino)thiopicolinoylthio)acetate, followed by the reaction of the latter with semicarbazide hydrochloride.

1-(3,5,6-trichloro - 4-methylaminothiopicolinoyl)semicarbazide having a molecular weight of 371 by the reaction of 3,5,6-trichloro-4-methylamino-2-(trichloromethyl)pyridine and sodium sulfide to obtain an intermediate sodium 3,5,6-trichloro-4-methylaminodithiopicolinate, followed by the reaction of the latter with sodium chloroacetate to obtain an intermediate sodium 2-(3,5,6-trichloro-4-methylaminothiopicolinoylthio)acetate, followed by the reaction of the latter with semicarbazide hydrochloride.

The compounds of the present invention are useful as parasiticides, adapted to be employed for the control of numerous undesirable organisms. Thus, the compounds have been found to be useful as toxic ingredient of piscicide and nematocide compositions. Some of the compounds are further useful as insecticide, fungicide, tickicide, miticide, microbicide and as anthelmintics.

The products of the present invention are useful as nematocides for the control of soil-dwelling nematodes. In a representative operation for nematocidal use, complete controls of the larvae of rootknot nematode (Meloidogyne spp.) were obtained when the larvae were contacted in separate operations with an aqueous dispersion containing 10 parts by weight of one of isopropyl 3,5-dichlorodithiopicolinate, 3-chloroallyl 3,5-dichlorodithiopicolinate, methyl 3,5-dichlorodithiopicolinate, methyl 6-chlorodithiopicolinate and 1-(6-chlorothiopicolinoyl)semicarbazide in a million parts by weight af dispersion.

The compounds of the present invention are also useful for the control of various water pests, such as daphnia, northern fat-headed minnow, lake emerald shiner, carp, and other trash fish. In a representative operation for the control of water pests, complete controls of daphnia are obtained when this aquatic pest in aqueous media are separately exposed to methyl 3,5-dichloro-4-(dimethylamino)dithiopicolinate, methyl 4-amino-3,5-dichlorodithiopicolinate, methyl 3,5-dichlorodithiopicolinate, and 3-chloroallyl 3,5-dichlorodithiopicolinate at a concentration of 1 part by weight per million parts by weight of medium for 24 hours.

Some of the compounds may also be used for the control of helminths infesting warm-blooded animals. In representative applications for helminth control, dispersions containing 300 p.p.m. of one of methyl 3,5-dichlorodithiopicolinate and methyl 3,6-dichlorodithiopicolinate were mixed in separate operations with feces of calves infected with roundworms, and the treated cultures incubated for about five days in a constant temperature chamber maintained at about 26°–28° C. At the end of this period, the cultures were examined under a microscope to determine the presence or absence of roundworms. It was found that both compounds gave complete control of roundworm larvae.

The compounds of the present invention are also useful as microbicides for the control of bacteria and fungi. Representative of such use is an operation where an aqueous dispersion containing 100 parts by weight of 2-(3,5-dichlorothiopicolinoylthio)acetic acid per million parts by weight of dispersion was carefully spaced as droplets on nutrient agar which had been previously inoculated with fire blight bacteria and then allowed to incubate for about 24 hours and thereafter examined for inhibition of microbial growth. It was found that 2-(3,5-dichlorothiopicolinoylthio)acetic acid gave clear zones of complete inhibition of microbial growth in and surrounding the areas where the aqueous dispersion had been applied.

The 2-(trichloromethyl)pyridine compounds which may be represented by Formula II when Y is hydrogen and which are the starting materials for many of the ester compounds and which may be the ultimate starting material for many of the nitrogen compounds, may be prepared by contacting α-picoline and hydrogen chloride at temperatures of about 50° C. to produce a liquid α-picoline hydrochloride composition, thereafter passing chlorine gas through the liquid mixture at temperatures of from about 95° to about 110° C. while irradiating the reaction mixture and then fractionally distilling the liquid mixture.

The amino - 2 - (trichloromethyl)pyridine compounds which may be represented by Formula II when Y is an amino group and which are the starting materials for many of the ester compounds and which may be the ultimate starting material for many of the nitrogen compounds may be prepared by mixing together and heating at temperature of from about 90° to about 125° C. at atmospheric or autogeneous pressure, a 2-(trichloromethyl)pyridine compound having one of the chloro groups in the 4 position and prepared as above described and an appropriate amine or ammonia. The amino-2-(trichloromethyl)pyridine compound is recovered from the reaction mixture by filtration, decantation or extraction, then washed and dried. The compound thus obtained may be purified, if desired, by distillation or recrystallization.

I claim:
1. A compound having the formula

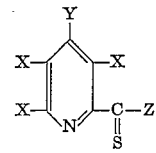

wherein each X is independently selected from the group consisting of hydrogen and chlorine wherein at least one X is chlorine; Y is selected from the group consisting of hydrogen, amino, monoalkylamino and dialkylamino wherein the alkyl contains from 1 to 4 carbon atoms, inclusive; and Z is selected from the group consisting of —SR, —NHNH$_2$, —NHR', —N(R")$_2$,

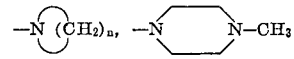

and —NHNHCONH$_2$, wherein R is selected from the group consisting of lower alkyl containing from 1 to 4 carbon atoms, inclusive, chloroallyl and carboxymethyl, R' and R" are lower alkyl containing from 1 to 4 carbon atoms, inclusive, and n is an integer of from 4 to 5, inclusive.

2. A compound according to claim 1 in which the chlorothiopicolinic acid compound is isopropyl 3,5-dichlorodithiopicolinate.

3. A compound according to claim 1 in which the chlorothiopicolinic acid compound is 3-chloroallyl 3,5-dichlorodithiopicolinate.

4. A compound according to claim 1 in which the chlorothiopicolinic acid compound is methyl 3,5-dichlorodithiopicolinate.

5. A compound according to claim 1 in which the chlorothiopicolinic acid compound is methyl 6-chlorodithiopicolinate.

6. A compound according to claim 1 in which the chlorothiopicolinic acid compound is 1-(6-chlorothiopicolinoyl)semicarbazide.

7. A compound according to claim 1 in which the chlorothiopicolinic acid compound is 3,5-dichlorothiopicolinic acid hydrazide.

8. A compound according to claim 1 in which the chlorothiopicolinic acid compound is 1-(3,5-dichlorothiopicolinoyl)piperidine.

9. A compound according to claim 1 in which the chlorothiopicolinic acid compound is 6-chlorothiopicolinamide.

10. A compound according to claim 1 in which the chlorothiopicolinic acid compound is methyl 3,6-dichlorodithiopicolinate.

References Cited

FOREIGN PATENTS 1,239,786    7/1960    France.
384,929    2/1965    Switzerland.

WALTER A. MODANCE, *Primary Examiner.*

ALAN L. ROTMAN, *Assistant Examiner.*